United States Patent [19]
Takamizawa et al.

[11] Patent Number: 4,870,035
[45] Date of Patent: Sep. 26, 1989

[54] PROCESS FOR MANUFACTURING ORGANIC SILAZANE POLYMERS AND PROCESS FOR MANUFACTURING CERAMICS FROM THE POLYMERS

[75] Inventors: Minoru Takamizawa, Niigata; Mitsuo Umemura; Masato Kanari, both of Annaka; Yoshihumi Takeda; Akira Hayashida, both of Niigata, all of Japan

[73] Assignee: Shin-Etsu Chemical Co., Ltd., Tokyo, Japan

[21] Appl. No.: 212,438

[22] Filed: Jun. 28, 1988

Related U.S. Application Data

[62] Division of Ser. No. 903,409, Sep. 3, 1986, Pat. No. 4,771,118.

[30] Foreign Application Priority Data

Jun. 10, 1986 [JP] Japan ................................. 61-135437

[51] Int. Cl.$^4$ ........................ C04B 35/52; C08G 77/06
[52] U.S. Cl. ........................................ 501/88; 501/92; 501/97; 501/154; 528/14; 528/25; 528/28; 525/274
[58] Field of Search ..................... 501/88, 92, 97, 154; 528/14, 25, 28; 525/274

[56] References Cited

U.S. PATENT DOCUMENTS

| | | | |
|---|---|---|---|
| 3,853,567 | 12/1974 | Verbeek | 501/92 |
| 3,892,583 | 7/1975 | Winter et al. | 501/92 |
| 4,482,669 | 11/1984 | Seyferth et al. | 528/28 |
| 4,543,344 | 9/1985 | Cannady | 501/95 |
| 4,675,424 | 6/1987 | King, III et al. | 501/154 |
| 4,771,118 | 9/1988 | Takamizawa et al. | 501/92 |

FOREIGN PATENT DOCUMENTS

| | | | |
|---|---|---|---|
| 0175382 | 3/1986 | European Pat. Off. | 501/154 |
| 0175383 | 3/1986 | European Pat. Off. | 501/154 |
| 0175384 | 3/1986 | European Pat. Off. | 501/154 |
| 1086932 | 2/1955 | France . | |
| 2197829 | 3/1974 | France . | |

OTHER PUBLICATIONS

Zhdanov, et al., "Catalytic Polycondensation of Organosilazanes", Polymer Science, U.S.S.R. vol. 23, No. 6, pp. 1429-1438 (1981).
Andrianov, et al., "Reactions of Organocyclosilazanes with Electrophilic and Nucleophilic Reagents", Jour. of Organometallic Chem. 3, (1965) pp. 129-137.
Andrianov et al., "Reactiion of α,ω-Dihydromethylsilazanes with Nucleophilic Reagents", M. V. Lomonosov Moscow Inst. of Fine Chem. Techn., Transl. from Doklady Akademii Nauk SSSR, vol. 176, No. 1, pp. 85-88, Sep. 1967.
Andrianov et al., "Synthesis of Isotopically Substituted Organosilazanes and Some Features of Their IR Spectra", M. V. Lomonosov Moscow Inst. of Fine Chemical Techn., Transl. from Zhurnal Obashchei Akademii, vol. 49, No. 12, pp. 2683-2689, Dec. 1979.

Primary Examiner—William R. Dixon, Jr.
Assistant Examiner—Anthony J. Green
Attorney, Agent, or Firm—Jules E. Goldberg

[57] ABSTRACT

A process for manufacturing an organic silazane polymer which comprises reacting ammonia with a mixture of methyldichlorosilane, methyltrichlorosilane and dimethyldichlorosilane to obtain an ammonolysis product. The ammonolysis product is polymerized in the presence of a basic catalyst capable of deprotonation to obtain an organic silazane polymer. The silazane polymer may be further melted, shaped and infusibilized. The thus infusibilized product is finally sintered to obtain a ceramic material.

13 Claims, No Drawings

PROCESS FOR MANUFACTURING ORGANIC SILAZANE POLYMERS AND PROCESS FOR MANUFACTURING CERAMICS FROM THE POLYMERS

This is a division of application Ser. No. 903,409, filed Sept. 3, 1986 now U.S. Pat. No. 4,771,118.

BACKGROUND OF THE INVENTION

1. Field of the Invention

This invention relates to a process for manufacturing organic silazane polymers which are suitably used as preceramic materials and also to a process for manufacturing ceramics from the organic silazane polymers.

2. Description of the Prior Art

Great interest has been currently shown in ceramics as materials which have good properties such as heat resistance, abrasion resistance, high-temperature strength and the like. However, because of the hardness and brittleness, ceramics are very difficult to process. For the manufacture of shaped ceramic articles, it is accordingly general to use a method which comprises molding a fine powder of ceramic material into a desired form such as by compression and sintering the molded article, or a precursor method in which an organic polymer, serving as a preceramic material, is melted or dissolved in a solvent, followed by processing the melted or dissolved polymer into a desired form and sintering it to render the polymer inorganic. The prominent feature of the precursor method resides in that ceramic products of such complex forms as will never be obtained in the sintering method for fine powder can be obtained, i.e. products of specific forms such as fibers or sheets can be manufactured.

Among ceramics, SiC and $Si_3N_4$ have attracted generally considerable attention because of the good characteristic properties thereof at high temperatures, e.g. SiC has a high heat resistance and a high-temperature strength and $Si_3N_4$ has a high thermal shock resistance and a high fracture toughness. Accordingly, there have been made various proposals on processes of producing $SiC-Si_3N_4$ ceramics and also on processes of producing organic silicon precursors according to the precursor method as is particularly shown (1) to (5) below. However, these proposed processes have still problems set forth below.

(1) In U.S. Pat. No. 3,853,567, there is disclosed a process of obtaining $SiC-Si_3N_4$ ceramics in which chlorosilanes and amines are reacted and subsequently heated at high temperatures to obtain carbosilazanes, followed by subjecting the carbosilazanes to spinning and infusibilization and then sintering at high temperatures of from 800° to 2000° C. However, this process requires high temperatures of 520° to 650° C. in order to obtain the carbosilazane, thus being very difficult to apply as an industrial process. In addition, the carbosilazanes are disadvantageous in that the yield of ceramic materials therefrom is as low as about 55%. As will be apparent from examples of this U.S. patent specification, the chlorosilanes used are only methyltrichlorosilane and dimethyldichlorosilane and the amine is methylamine alone.

(2) U.S. Pat. No. 4,097,294 describes conversion of various silicon-containing polymers into ceramic materials by pyrolysis. Only one silazane polymer is set forth in this patent and the ceramic yield is as low as 12% in a maximum. Although this U.S. patent specification describes that ceramic materials may be formed into fibers or thin films, the formation is merely suggested as possible. In fact, there is made little or no reference to moldability and processability of polymers which are considered to be most important in the precursor method.

(3) There is known production of silazane polymers, for example, by reaction between chlorodisilanes and disilazanes in U.S. Pat. No. 4,340,619, by reaction between chlorosilanes and disilazanes in U.S. Pat. No. 4,312,970, by reaction between chlorodisilanes and ammonia in U.S. Pat. No. 4,395,460, and by reaction between trichlorosilane and disilazanes in U.S. Pat. No. 4,543,344. Moreover, silazane polymers are prepared by addition of metal halides to chlorosilanes and disilazanes as disclosed in U.S. Pat. No. 4,535,007 and by addition of metal halides to chlorodisilanes and disilazanes as disclosed in U.S. Pat. No. 4,482,689. It is stated in these references that all the silazane polymers mentioned above may be converted to ceramic materials by pyrolysis. However, the ceramic yields of all the silazane polymers are, at most, 50 to 60 wt %. Similar to the U.S. Pat. No. 4,097,294, all the above references do not describe in detail moldability and processability of the polymers, which are most important in the precursor method. In particular, most references do not make mention of ceramic fibers in examples, or do not refer to strength of ceramic fibers in case where examples of ceramic fibers are shown. Only in U.S. Pat. No. 4,482,689, there is a description of strength, but ceramic fibers having such a low tensile strength as of 53 kg/mm² or 63 kg/mm² are obtained.

(4) In U.S. Pat. No. 4,482,669, there is described a process of preparing silazane polymers which comprises reacting ammonia with an organic silicon compound of the formula,

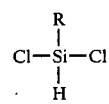

to obtain an ammonolysis product and subjecting the product to condensation by dehydrogenation with alkali metal or alkalie earth metal hydrides to obtain silazane polymers. It is stated that the polymers obtained in this process can be controlled in property depending on the degree of condensation by deprotonation and may take various forms of from oils to solids having no definite melting points. However, when a polymer melt is molded or processed to prepare, for example, a continuous fiber by melt spinning, it is necessary that the polymer have a certain degree of polymerization and be thermally stable. In the above process, the polymer obtained will be in the form of a solid which has not a melting point unless the polymerization is stopped on its way. In order to obtain a fusible polymer, the reaction time, reaction temperature, amounts of a catalyst and a solvent have to be controlled precisely but such a control may be very difficult and may not usually reproducible. The polymers obtained by the process are not thermally stable with the disadvantage that gel-like substances are formed. In view of the above two problems, this process may not be always considered to be suitable as an industrial process of manufacturing silazane polymers.

(5) Japanese Laid-open Patent Application No. 60-228489 describes a process of preparing a silazane polymer which comprises producing cyclic silazane from a compound of the formula, CH₃, and monomethylamine, followed

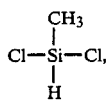

reacting the cyclic silazane with ammonia. In this patent application, it is stated that the polymer is suitable as a material for chemical deposition, but physical properties of the polymer are not described in detail. The ceramic yield is not indicated at all.

As will be apparent from the foregoing description, hitherto proposed silazane polymers, serving as preceramic materials, are not always beneficial for industrial production. In addition, these polymers were found to be poor with respect to moldability and processability into ceramic fibers and like with a poor ceramic yield. Ceramic products, e.g. ceramic fibers, obtained from the known preceramic polysilazane materials were found to have relatively poor physical properties such as strength, modulus of elasticity and the like.

SUMMARY OF THE INVENTION

It is therefore an object of the present invention to provide a process for manufacturing preceramic materials which is adapted for industrial production and which enables one to produce the preceramic materials having good moldability and processability in high ceramic yield.

It is another object of the invention to provide a process for manufacturing ceramics composed of SiC–Si₃N₄ of high quality from the preceramic polymer materials.

In order to develop a process of manufacturing ceramic products which may belong to the art of a precursor method and also a process of manufacturing preceramic polymer materials which are suitable for the manufacture of the ceramic products and have good moldability and processability, our attention has been drawn to SiC–Si₃N₄ ceramics which have good high-temperature characteristics of both SiC and Si₃N₄. Accordingly, intensive studies have been made on the manufacture of SiC–Si₃N₄ ceramics according to a precursor method. As a result, it has been found that silazane polymers having good thermal stability and a controlled degree of polymerization can be obtained by mixing three chlorosilanes of methyldichlorosilane, methyltrichlorosilane and dimethyldichlorosilane, reacting the mixture with ammonia to obtain an ammonolysis product, subjecting the ammonolysis product to condensation by dehydrogenation with a catalyst capable of deprotonation such as, for example, an alkali metal or alkaline earth metal hydride, and completing the condensation reaction. When the silazane polymers are melted, molded, heated in air or irradiated with an electron beam for infusibilization, and sintered, ceramics of high quality composed predominantly of SiC and Si₃N₄ can be obtained. The present invention is accomplished based on the above findings.

According to one embodiment of the present invention, there is provided a process for manufacturing organic silazane polymers which comprises reacting a mixture of methyldichlorosilane, methyltrichlorosilane and dimethyldichlorosilane and ammonia to obtain an ammonolysis product, and polymerizing the ammonolysis product in the presence of a basic catalyst capable of deprotonation. The present invention also provides an organic silazane polymer obtained by the above process.

According to another embodiment of the invention, there is provided a process for manufacturing ceramics which comprises reacting a mixture of methyldichlorosilane, methyltrichlorosilane and dimethyldichlorosilane and ammonia to obtain an ammonolysis product, polymerizing the ammonolysis product in the presence of a basic catalyst capable of deprotonation to obtain an organic silazane polymer, melting, molding and infusibilizing the organic silazane polymer, and sintering the infusibilized polymer to obtain a ceramic material. There is also provided a ceramic material composed of SiC–Si₃N₄ obtained by the above process.

The above and other objects, features and advantages of the present invention will be more apparent from the following description.

DETAILED DESCRIPTION AND EMBODIMENTS OF THE INVENTION

In the process of manufacturing organic silazane polymers according to the invention, three types of methylchlorosilanes, which are methyldichlorosilane, methyltrichlorosilane and dimethyldichlorosilane, are used as one of the starting materials. After reaction between the mixture and ammonia, a catalyst is acted only on the resulting product to complete the condensation by dehydrogenation, thereby obtaining an organic silazane polymer of high quality having good moldability and processability in a high ceramic yield of, for example, 70 to 80%. This process does not require a precise or minute control of reaction time, reaction temperature, and amounts of catalyst and solvent and does not require troublesome operations of stopping the polymerization on its way, thus ensuring industrial and easy manufacture of the silazane polymer.

The process of manufacturing ceramics composed of SiC–Si₃N₄ according to the invention uses the organic silazane polymer as a precursor or preceramic material, from which ceramic products of a desired form having excellent physical properties can be readily obtained.

It will be noted that use of chlorosilanes as a starting material for preparing silazane polymers or preceramic materials is conventionally known as set forth before. However, it has never been known heretofore that the afore-indicated three chlorosilanes are selectively used in combination among a number of chlorosilanes and that after ammonolysis of the mixture, the resulting product is subjected to condensation by dehydrogenation in the presence of a specific type of catalyst to obtain silazane polymers having such good characteristics as will never been experienced in prior art. These are first discovered by us.

The chlorosilanes used in the practice of the invention are a combination of methyldichlorosilane, methyltrichlorosilane and dimethyldichlorosilane, which are preferably used in amounts of from 55 to 80 mole %, 10 to 30 mole % and from 5 to 25 mole %, respectively. When these chlorosilanes are used in combination, novel silazane polymers are obtained. The silazane polymers have chemical structures different from a silazane polymer obtained from methyldichlorosilane alone as set forth in U.S. Pat. No. 4,482,669. More particularly, the silazane polymers obtained according to the invention comprise different types of repeating units in various bridges of these repeating units in the structure. Since the silazane polymer having the novel structure different from the known silazane polymer structure is used as the preceramic material, the ceramic yield is remarkably improved over the yields of known processes of manufacturing ceramics according to the precursor method. Moreover, the resultant ceramics have greatly improved physical properties such as tensile strength, modulus of elasticity and the like.

As set forth before, the mixture of methyldichlorosilane, methyltrichlorosilane and dimethyldichlorosilane, used as one of starting materials for preparing organic silazane polymers according to the invention, is preferred to have a composition of 55 to 80 mole % of methyldichlorosilane, from 10 to 30 mole % of methyltrichlorosilane, and from 5 to 25 mole % of dimethyldichlorosilane. Outside the above compositional ranges, the resulting polymers may become oily or may have a high melting point over 300° C. and is incapable of melting, thus being unfavorable.

The preparation of an ammonolysis product from the mixture of the methylchlorosilanes is not critical with respect to the procedure. For instance, there is conveniently used a process in which the mixture is reacted with gaseous $NH_3$ in organic solvents and, after removal of the ammonium chloride byproduct, the organic solvent is stripped off.

In a subsequent step, the ammonolysis product is polymerized in the presence of a basic catalyst capable of deprotonation. Preferably, the ammonolysis product is subjected to condensation by dehydrogenation with the catalyst in solvent to complete the reaction. The basic catalyst capable of deprotonation includes alkali metal or alkaline earth metal hydrides or metal amides such as KH, NaH, $NaNH_2$, $KNH_2$ and the like. The solvents used in the polymerization step may be ethers such as THF, dialkyl ethers and the like, aliphatic hydrocarbons such as pentane, hexane and the like, and aromatic hydrocarbons such as benzene, toluene, xylene and the like. Although the polymerization may usually be effected at normal temperatures, the polymerization temperature should be appropriately selected from a range of 0° to 200° C., depending on the type of solvent.

After completion of the condensation by dehydrogenation, the remaining basic catalyst species is preferably decomposed with a nucleophilic compound, such as methyl iodide. The resulting insoluble matter is removed by filtration and the solvent is distilled off under reduced pressure. As a result, a silazane polymer having a melting point of from 60° to 200° C. and an intrinsic viscosity of from 0.06 to 0.09 is obtained. The completion of the condensation reaction can be confirmed by stop of gas evolution.

The degree of polymerization and melting point of the silazane polymer can be suitably controlled by changing the mixing ratios of the methylchlorosilanes.

The organic silazane polymers obtained in this manner have high moldability and processability and can be shaped, as preceramic materials, into suitable forms such as, for example, fibers or sheets. In addition, the polymers may be used as binder or adhesives.

In the process of manufacturing ceramics according to the invention, the organic silazane polymers are melted, shaped or molded, infusibilized and finally sintered. For this purpose, the polymer should preferably have a melting point of 60° to 200° C. and an intrinsic viscosity of 0.06 to 0.09 as determined in benzene solution at 20° C. because such polymers permit easy melting and shaping.

The manners of melting, shaping and sintering of the organic silazane polymers are not critical. The polymers are shaped or molded as desired and sintered to obtain ceramic products of desired forms composed of $SiC-Si_3N_4$.

For instance, when ceramic fibers are fabricated, the organic silazane polymer is heated to melt and spun by melting spinning. The spinning temperature may vary depending on the melting point of the polymer, and is favorably in the range of from 100° to 300° C. Next, the thread-like material is infusibilized by heating in air or by irradiation with an electron beam in vacuum or in an inert gas such as $N_2$ gas. In this step, the heating in air is preferably effected at a temperature of from 50° to 150° C. The electron beam irradiation is preferably at an exposed dose of from 50 to 200 Mrad. The thus infusibilized thread-like material is sintered at high temperatures in a tension-free or tensioned condition, thereby obtaining ceramic fibers composed mainly of SiC and $Si_3N_4$ and having good strength and modulus of elasticity. The sintering is preferably effected in vacuum or in an atmosphere of one or more gases, such as an inert gas including Ar, etc., $N_2$, $H_2$, $NH_3$ and the like, at a temperature of from 700° to 2000° C., preferably from 700° to 1500° C. The sintering under tension is more preferable, by which there can be obtained ceramic fibers of high quality having a tensile strength of from 200 to 300 $kg/mm^2$ and a modulus of elasticity of from 15 to 30 $tons/mm^2$.

As will be apparent from the foregoing, the organic silazane polymers can be conveniently produced according to the process of the invention. The silazane polymers are thermally stable and have a desired degree of polymerization with good moldability and processability. The polymers can be manufactured in high ceramic yield and thus, are very suitable for use as preceramic materials from ceramic fibers.

On the other hand, according to the process of manufacturing ceramics of the invention, ceramics of high quality composed mainly of SiC and $Si_3N_4$ can be obtained in high ceramic yield. Ceramic products of desired forms such as ceramic fibers and sheets having high strength and high modulus of elasticity can be obtained.

The present invention is more particularly described by way of examples and comparative examples. The examples should not be construed as limiting the present invention.

[EXAMPLE 1]

Ammonolysis step (1) using methyldichlorosilane:methyltrichlorosilane:dimethyldichlorosilane=75:15:10 (mole %)

A dried, one liter four-necked flask equipped with an agitator, a thermometer, an $NH_3$ gas inlet tube and dryice-methanol cooler was charged with 850 ml of hexane, to which 43.1 g of methyldichlorosilane, 11.2 g of methyltrichlorosilane and 6.5 g of dimethyldichlorosilane were added. followed by cooling down to −20° C. An excess of gaseous ammonia was added to the solution at a rate of 12 liters/hour for 4 hours (a total amount of added $NH_3$ of 2.1 mols). The reaction mixture was heated to room temperature, whereupon a cooling device was changed to an air-cooling condenser in order to purge excess $NH_3$. Thereafter, byproduct ammonium chloride was removed from the reaction mixture by filtration in a dry box. The resulting filter cake was washed with 200 ml of hexane. The hexane was stripped off from the filtrate under a reduced pressure of 1 mm Hg/60° C. The residue (ammonolysis product) was a transparent fluid liquid and was obtained in an amount of 26 g.

Ammonolysis step (2) using methyldichlorosilane:methyltrichlorosilane:dimethyldichlorosilane=65:25:10 (mole %)

850 ml of hexane was charged into a one liter four-necked flask having the same equipment as used above, to which 29.9 g of methyldichlorosilane, 14.9 g of methyltrichlorosilane and 5.2 g of dimethyldichlorosilane were added, followed by cooling down to −20° C. Gaseous ammonia was added to the solution at a rate of 12 liters/hour for 4 hours. Thereafter, the procedure of (1) was repeated, thereby obtaining 20 g of a transparent, fluid liquid (ammonolysis product).

Ammonolysis step (3) using methyldichlorosilane:methyltrichlorosilane:dimethyldichlorosilane=65:20:15 (mole %)

A 2 liter four-necked flask having the same equipment as in (1) was charged with 1500 ml of dehydrated hexane, to which 59.8 g of methyldichlorosilane, 23.9 g of methyltrichlorosilane and 15.5 g of dimethyldichlorosilane were added, followed by reaction with gaseous ammonia in the same manner as described above. Subsequently, the above procedure of (1) was repeated, thereby obtaining 42 g of a transparent fluid liquid (ammonolysis product).

Polymerization step (1):

A 300 ml three-necked flask was equipped with an agitator, a thermometer and a dropping funnel, into which 0.2 g (5 mmols) of potassium hydride and 125 ml of THF dehydrated with NaH were charged in a dry box. The flask was removed from the dry box and connected to $N_2$ gas streamed tube. While the mixture was agitated at room temperatures to disperse KH, 10 g of the product obtained in the ammonolysis step (1) and dissolved in 75 ml of THF was gradually added from dropping funnel in 15 minutes. During the addition, gases were evolved in large amounts and 1 hour after the addition, the gas evolution was ceased. When 3 g of methyl iodide was added, a white precipitate of KI was formed. After further agitation for 30 minutes, most THF solvent was removed under reduced pressure and 80 ml of hexane was added to the residue. The mixture was filtered and the filtrate was subjected to removal of hexane under a reduced pressure (1 mm Hg) at 70° C., thereby obtaining 9.1 g of a viscous solid (silazane polymer). This product had an intrinsic viscosity of 0.07 (benzene, 20° C.) and a melting point of 90° C. and was soluble in organic solvents such as hexane, benzene, THF and the like. The IR analysis revealed absorptions of NH at 3400 cm$^{-1}$, C—H at 2980 cm$^{-1}$, Si—H at 2150 cm$^{-1}$, and SiCH$_3$ at 1260 cm$^{-1}$. The molecular weight by cryoscopic method using benzene was 1020.

Polymerization step (2):

10 g of the ammonolysis product obtained in the ammonolysis step (2) was reacted with 0.2 g of KH in THF for 90 minutes in the same manner as in polymerization step (1). After the gas evolution was ceased, CH$_3$I was added, followed by repeating the procedure of polymerization step (1), thereby obtaining 9.3 g of a viscous solid (silazane polymer). The polymer had an intrinsic viscosity of 0.08 and a melting point of 120° C.

Polymerization step (3):

10 g of the ammonolysis product obtained in the ammonolysis step (3) was reacted with 0.2 g of KH in THF for 90 minutes in the same manner as in polymerization step (1). After the gas evolution was ceased, CH$_3$I was added, followed by repeating the procedure of polymerization step (1), thereby obtaining 9.1 g of a viscous solid (silazane polymer). The polymer had an intrinsic viscosity of 0.07 and a melting point of 115° C.

Fiber preparation step (1):

30 g of the silazane polymer obtained in polymerization step (1) was melt spun at 130° C. by the use of a mono-hole melt spinning apparatus. The melt spinning was carried out very smoothly even after 4 hours and was performed at a take-up speed of 400 m/minute. The resulting green thread was subjected to infusibilization treatment by electron beam irradiation at 120 Mrad. Thereafter, the thread was sintered under a slight tension in a stream of $N_2$ at a heat-up rate of 100° C./hour at 1100° C. for 30 minutes.

The ceramic yield was 75%. The resulting fiber has a diameter of 6 micrometers, a tensile strength of 250 kg/mm$^2$ and a modulus of elasticity of 25 tons/mm$^2$. The elementary analysis of the fiber revealed that the fiber contained 58.3% of Si, 20.3% of C, 19.4% of N and 2% of O, and was mainly composed of $SiC-Si_3N_4$.

Fiber preparation step (2):

10 g of the silazane polymer obtained in polymerization step (2) was spun at 160° C. by the use of such a melt spinning apparatus as used in fiber preparation step (1). The spinning was carried out very smoothly at a take-up speed of 420 m/minute. The resultant green thread was thermally infusibilized under a light tension in air at 90° to 110° C. (5° C./hour). Thereafter, the thread was sintered in a tension-free condition in a stream of $N_2$ at a heat-up speed of 100° C./hour at 1200° C. for 30 minutes. The ceramic yield was found to be 80% and the resulting fiber had a diameter of 8 micrometers, a tensile strength of 200 kg/mm$^2$ and a modulus of elasticity of 17 tons/mm$^2$. The elementary analysis of the fiber revealed that the fiber contained 56.2% of Si, 19.2% of C, 15.4% of N and 9.2% of O, and was mainly composed of $SiC-Si_3N_4$.

Fiber preparation step (3):

20 g of the silazane polymer obtained in polymerization step (3) was spun in a dry box by the use of such a melt spinning apparatus as used in fiber preparation step (1) at 150° C. at a take-up speed of 450 m/minute. The spinning was smoothly continued. The resulting green thread was subjected to infusibilization in vacuum by irradiation of 90 Mrad., by the use of an electron beam generator. Thereafter, the resulting fiber is sintered under tension in a steam of $N_2$ at 1250° C. (100° C./hour) for 30 minutes. The ceramic yield was found to be 77%. The fiber had a diameter of 6 micrometers, a tensile strength so 260 kg/mm$^2$ and a modulus of elasticity of 23 tons/mm$^2$.

[COMPARATIVE EXAMPLE]

Ammonolysis step:

A one liter four-necked flask equipped with an agitator, a thermometer, an NH$_3$ gas inlet tube and a dryice-methanol cooler was charged with 850 ml of dehydrated hexane, to which 46 g of methyldichlorosilane was added. Gaseous ammonia was introduced into the solution for reaction at a rate of 12 liters/hour for 3.5 hours. Thereafter, the ammonolysis step (1) of Example was repeated, thereby obtaining 20 g (85%) of a transparent fluid liquid.

Polymerization step:

After charging 0.2 g of KH and 125 ml of THF into a 300 ml three-necked flask and agitating to disperse KH in THF, a mixture of 75 ml of THF and 10 g of the transparent fluid liquid obtained above was dropped into the dispersion from a dropping funnel at room temperatures in 15 minutes. Agitation was continued for thirty minutes after completion of the dropping, and then 2 g of $CH_3I$ was added to stop the reaction on its way. Subsequently, the procedure of polymerization step (1) of Example was repeated, thereby obtaining 9.0 g of a viscous solid. This solid material had an intrinsic viscosity of 0.06 and a melting point of 75° C. The polymerization in this system was controlled with respect to the temperatures, amount of the catalyst, and polymerization time in order to keep a constant degree of polymerization. However, reproducible results could not be obtained.

Fiber preparation step:

8 g of the resulting silazane polymer was charged into a mono-hole (nozzle diameter: 0.5 mm) melt spinning apparatus and melt spun at 110° C. Initially, discharge from the nozzle was good and the spinning was possible. Thirty minutes after commencement, discharge from the nozzle stopped. Although the temperature gradually increased, no discharge took place. After cooling, the polymer was removed and its melting point was measured. As a result, it was found that the polymer did not melt even at 300° C. and was insoluble in various solvents. The green thread initially obtained was subjected to irradiation with an electron beam at 90 Mrad., followed by sintering in a stream of $N_2$ at a heat-up speed of 100° C./hour at 1100° C. for 30 minutes. The ceramic yield was found to be 58%. The resulting fiber had a diameter of 7 micrometers, a tensile strength of 50 kg/mm$^2$ and a modulus of elasticity of 5 tons/mm$^2$, thus being poorer than in the case of the invention.

What is claimed is:

1. A process for manufacturing a ceramic material which comprises reacting ammonia with a mixture of methyldichlorosilane, methyltrichlorosilane and dimethyldichlorosilane to obtain anammonolysis product, and polymerizing the ammonolysis product in the presence of a basic catalyst capable of deprotonation to obtain an organic silazane polymer, melting, molding and infusibilizing the silazane polymer, and sintering the resulting polymer to obtain a ceramic material.

2. A process according to claim 1, wherein mixing ratios of methyldichlorosilane, methyltrichlorosilane and dimethyldichlorosilane are in ranges of 55 to 80 mole %, 10 to 30 mole % and 5 to 25 mole %, respectively.

3. A process according to claim 1, wherein said organic silazane polymer has a melting point of 60° to 200° C. and an intrinsic viscosity of 0.06 to 0.09 as determined in benzene at 20° C.

4. A process according to claim 1, wherein said organic silazane polymer is infusibilized in air at a temperature of from 50° to 150° C.

5. A process according to claim 1, wherein said organic silazane polymer is infusibilized in vacuum or in $N_2$ gas by irradiation of an electron beam at an exposed dose of from 50 to 200 Mrad.

6. A process according to claim 1, wherein said organic silazane polymer is melted and spun to obtain ceramic fibers.

7. A process according to claim 1, wherein the sintering is effected at a temperature of from 700° to 2000° C.

8. A process according to claim 7, wherein the sintering is effected in vacuum or in an atmosphere of at least one gas selected from the group consisting of inert gases, $N_2$, $H_2$ and $NH_3$ gases.

9. The process of claim 1 wherein said basic catalyst is KH, NaH, $NaNH_2$, or $KNH_2$.

10. The process of claim 1 wherein the ammonolysis reaction is effected in an inert solvent.

11. The process of claim 1 wherein the polymerization reaction is effected in an inert solvent at a temperature of from 0° to 200° C.

12. The process of claim 1 further comprising adding an electrophilic compound after completion of the polymerization reaction whereby the remaining basic catalyst is decomposed.

13. The process of claim 1 wherein the basic catalyst is selected from the group consisting of alkali metal hydrides, alkaline earth metal hydrides, alkali metal amides and alkaline earth metal amides.

* * * * *